United States Patent [19]

Schadler

[11] Patent Number: 4,828,273

[45] Date of Patent: May 9, 1989

[54] APPARATUS FOR THE TRANSMISSION OF ROTARY MOTION THROUGH THE WALL OF A VACUUM CHAMBER

[75] Inventor: Walter Schadler, Triesen, Liechtenstein

[73] Assignee: Balzers Aktiengesellschaft, Fürstentum, Liechtenstein

[21] Appl. No.: 209,867

[22] Filed: Jun. 22, 1988

[30] Foreign Application Priority Data

Aug. 18, 1987 [CH] Switzerland ............. 03171/87

[51] Int. Cl.⁴ ............................................. F16J 15/18
[52] U.S. Cl. ..................................... 277/165; 277/177
[58] Field of Search ............... 277/138, 165, 173–214

[56] References Cited

U.S. PATENT DOCUMENTS

| | | | |
|---|---|---|---|
| 3,331,609 | 7/1967 | Moran | 277/165 X |
| 3,526,407 | 9/1970 | Chattin et al. | 277/165 X |
| 4,020,910 | 5/1977 | Peterson et al. | 277/174 X |
| 4,645,216 | 2/1987 | Selvatici | 277/165 X |

FOREIGN PATENT DOCUMENTS 392179 9/1965 Switzerland ............. 277/165

*Primary Examiner*—Robert S. Ward
*Attorney, Agent, or Firm*—Notaro & Michalos

[57] ABSTRACT

Rotary lead-throughs through the wall of vacuum chambers have to be lubricated until now in order to avoid cold welding of a metallic shaft with vacuum sealing rings of the lead-through. The invention pertains to a new construction in which the inner wall of a bore through the wall of the vacuum chamber, through which the shaft is led, is lined with a sleeve of a low-friction synthetic material, preferentially polytetrafluoro-ethylene, with the sleeve being sealed against the inner wall and against the shaft by sealing rings, preferentially made of an elastomer. Through this construction, constant minimum friction, without the necessity of using additional lubricating agents and reliable sealing in dry operation, even under maximum stress, are acheived.

5 Claims, 1 Drawing Sheet

U.S. Patent
May 9, 1989
4,828,273
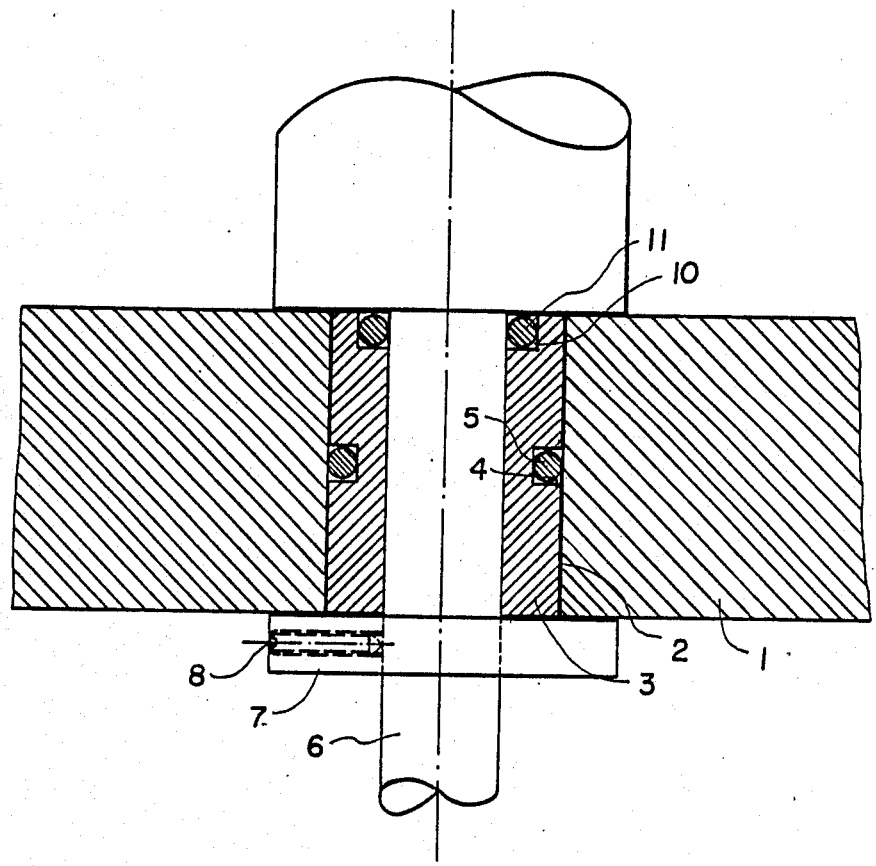

APPARATUS FOR THE TRANSMISSION OF ROTARY MOTION THROUGH THE WALL OF A VACUUM CHAMBER

FIELD AND BACKGROUND OF THE INVENTION

The present invention relates in general to an arrangement for the transmission of rotary motion into a vacuum chamber, and in particular to a new and useful apparatus which has a shaft held in a bore of the chamber wall for transmitting the rotary motion, as well as sealing rings between the inner wall of the bore and the shaft for creating a vacuum-tight seal.

In rotary transmission lead-throughs with seals of conventional design (for example, lip seals), lubrication of the sliding surfaces is absolutely necessary. The lubricant has primarily the function of forming a lubricating film between the sliding surfaces of the shaft and the sealing rings, and the reciprocal pressure with which the sliding surfaces press against each other, must always be dimensioned so that a sufficiently thick lubricating film can form. In the most favorable case, a coefficient of friction of approximately 0.05 can be achieved. Such lubricating film, however, always has the undesirable property of flowing along the surface wetted by it, and in this way, it can also reach the interior of the vacuum chamber and contaminate it. If the attempt is made to decrease the supply of the lubricating agent, for example, by increasing the pressure between shaft and sealing rings, or by using highly viscous lubricating oils or greases, this not only leads to an undesirable increase of the coefficient of friction, but also often to the fact that the sliding surfaces run dry due to the poor emergency running properties of the sealing material, often to the so-called "eating away" (pitting) point which represents non-repairable damage and, consequently, improper sealing. To this day, no sealing material has been found which has sufficiently reliable emergency running properties under moderately strong load relative to metallic surfaces. By using molybdenum disulfide as a slide agent, the coefficient of friction, even when running dry, can be kept relatively low, however, this does not solve the problem. Such lubricating film, once damaged, does not repair itself, but the damage can progress and can eventually bring about total loss of the emergency running properties. In addition, the coefficient of friction (at approximately $0.1 = \mu$) is still relatively high, so that under great load, and due to the poor ability to conduct heat of all sealing materials, thermal over-stressing of the seal can occur.

SUMMARY OF THE INVENTION

The present invention is provided for alleviating these disadvantages of known seals and of making available a rotary transmission lead-through for vacuum equipment, which operates entirely without lubricating agents and which results in the least possible wear and tear and, hence, has a long serviceable life.

This task is solved in an apparatus of the invention for transmitting rotary motions through the wall of a vacuum chamber, which has a shaft held in a bore of the chamber wall for transmitting the rotary motion, as well as sealing rings between the inner wall of the bore and the shaft for the formation of a vacuum-tight seal. In accordance with the invention, the inner wall of the bore is lined with a sleeve of a low-friction synthetic material and the sleeve, in turn, is sealed with sealing rings against the inner wall of the bore and against the shaft.

In a preferred embodiment of the invention, the sleeve consists of polytetrafluoroethylene (PTFE, trade name "TEFLON"), and the sealing rings of an elastomer, since it has been shown that especially with a material pair of this nature, a rotary lead-through with minimum constant friction and reliable sealing can be created without the use of an additional lubricating agent. A rotary lead-through, according to the invention, can be built with small dimensions, the sealing ability of which, even after a large number of rotation (for example, 100,000), remains fully intact. The invention can be constructed of simple rotary parts which are easy to produce. The additional demand often made of vacuum-tight rotary transmission lead-throughs, that, apart from a reliable vacuum seal, sufficient emergency run properties must simultaneously also be given, is likewise fulfilled with the mentioned preferred embodiment of the invention. On the one hand, the elasticity and plasticity of the sealing rings is indeed great enough to perform the sealing function and, on the other hand, polytetrafluoroethylene, as is known, has a very low coefficient of friction ($\mu = 0.02$). As indicated in a publication by Bowden and Tabor in the British Journal of Applied Physics, 1966, Vol. 17, page 1521, PTFE also has the special property that, when parts of the mentioned material pair rub against each other, even when sliding, while being maximally stressed, they do not become welded to each other. Examples of the elastomer that can be used as sealing rings for this invention can be found in this publication. All other known materials, by contrast, become welded as soon as the frictional resistance reaches a given value.

If the excellent emergency running properties are intended to be utilized for a rotary lead-through, a suitable constructional design must be selected so as to insure that the reciprocal pressure of the slide surfaces remains constant in spite of possible irreversible plastic deformation which cannot be avoided entirely. With the construction according to the present invention, this goal, too, is reached.

Accordingly, an object of the present invention is to provide an apparatus for transmitting rotary motion through the wall of a vacuum chamber having a bore therethrough, comprising: a sleeve of low friction synthetic material disposed in the bore and having an outer surface in contact with an inner surface of the bore; a shaft mounted for rotation through said sleeve; a first sealing ring engaged between the inner surface of the bore and the sleeve for maintaining a vacuum-tight seal between said sleeve and the vacuum chamber wall; and a second sealing ring engaged with the shaft for rotation therewith, and against the sleeve for sliding with respect to the sleeve and for maintaining a vacuum-tight seal between the shaft and the sleeve.

A further object of the present invention is to provide such an apparatus wherein the sleeve is made of polytetrafluoroethylene, the first and second sealing rings being made of elastomer.

A still further object of the present invention is to provide an apparatus for transmitting rotary motion through the wall of a vacuum chamber which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The only figure of the drawing is an axial sectional view taken through a vacuum rotary lead-through and the floor of a vacuum chamber.

DESCRIPTION OF THE PREFERRED EMBODIMENT

Referring to the drawing in particular, the invention embodied therein comprises an apparatus for transmitting rotary motion through the wall of a vacuum chamber, shown as a vacuum chamber floor 1, for example. Motion is to be transmitted between the exterior of the vacuum chamber, which is below floor 1 in the figure, and the interior of the vacuum chamber, which is above floor 1 in the figure.

The floor 1 which is of a thickness of, for example, 13 mm has a bore of 10 mm of clear width or diameter, the inner wall 2 of which is provided with a sheathing in the form of a bushing or sleeve 3 of polytetrafluoroethylene. The outside surface of the sleeve 3 is, as is shown in the drawing, fully in contact with the inner wall 2 of the bore, and is sealed against it by a sealing ring 5 placed in an annular groove 4 in the sleeve. In this example, the sealing ring consists of a customary vacuum sealing material, preferably of an elastomer. The shaft 6 for transmitting rotation is led through the sleeve 3 and is, in order to be axially secured, reinforced or enlarged, with respect to its diameter on one side (in the drawing at the top) of the wall 1, and on the other side, is provided with an annular disk 7, which can be secured by a set screw 8 on the shaft 6. With this construction, the position of the shaft axis in the axial direction, is fixed, and simultaneously, the polytetrafluoroethylene of the sleeve 3 cannot become deformed over the course of time and cannot flow off.

For sealing the shaft 6 against the inner wall of the sleeve, the sleeve is provided with a shoulder 10, in which an additional sealing ring 11 is placed, which preferentially likewise consists of an elastomer. Ring 11 is engaged to shaft 6, so as to rotate therewith.

If, when operating a device (not shown), in the vacuum chamber, the shaft 6 is rotated in the sleeve 3, the sealing ring 11 moves with the shaft, hence, also slides only against one polytetrafluoroethylene surface of shoulder 10, which results in low friction. The sealing ring 5, on the other hand, which seals sleeve 3 against the inner wall 2 of the bore, is stationary.

An additional advantage of the invention, which is important for many applications, lies in the fact, that with it, rotary lead-throughs can be built with shafts having very small diameters. While the ring-shaped lip seals of classic rotary lead-throughs are commercially available at most, up to a diameter of approximately 4 mm, the toroidal sealing rings such as are used in the invention, are also available for smaller diameters of, for example, only 2 mm. If in a given application, such a thin shaft is sufficient for the transmission of the intended rotational momentum into the vacuum chamber, a small diameter of the ring has the advantage that the friction becomes less, so that in this case, also less expensive motors of lower power can be used.

As can be seen in the drawing, the sleeve 3, as well as the sealing rings 5 and 11 in the described arrangement, are enclosed between other structural parts in such a way that they are neither subjected to plastic deformation which might impair their function, nor are they able to be displaced during operation by forces of any kind from the position appropriate to their function.

The rotary lead-through shown in the drawing through the floor of a vacuum chamber, can, obviously, in corresponding manner, also be used as rotary lead-through through any wall of a vacuum chamber.

While a specific embodiment of the invention has been shown and described in detail to illustrate the application of the principles of the invention, it will be understood that the invention may be embodied otherwise without departing from such principles.

The invention claimed is:

1. An apparatus for transmitting rotary motion through the wall of a vacuum chamber having a bore therethrough, comprising
   a sleeve of low friction synthetic material disposed in the bore and having an outer surface in contact with an inner surface of the bore;
   a shaft mounted for rotation through said sleeve;
   a first sealing ring engaged between the inner surface wall of the bore and said sleeve for maintaining a vacuum-tight seal between said sleeve and the vacuum chamber wall; and
   a second sealing ring engaged with said shaft for rotation therewith and against said sleeve for sliding with respect to said sleeve and for maintaining a vacuum-tight seal between said shaft and said sleeve.

2. An apparatus according to claim 1, wherein said sleeve is made of polytetrafluoroethylene.

3. An apparatus according to claim 1, wherein each of said first and second sealing rings are made of an elastomer.

4. An apparatus according to claim 1, wherein said sleeve consists of polytetrafluoroethylene, each of said sealing rings consists of an elastomer, the wall having inner and outer surfaces, said sleeve having an inner surface flush with said inner surface of the wall, said sleeve having an outer surface flush with said outer surface of the wall, said sleeve having a central bore therethrough for receiving said shaft and being in contact with said shaft in said central bore of said sleeve, said sleeve having an outer annular groove for receiving said first sealing ring and an inner shoulder adjacent one end of said sleeve bore for receiving said second sealing ring.

5. An apparatus according to claim 4, wherein said shaft includes a large diameter portion on one side of said sleeve and wall for extending over said sleeve, and disk means fixed to said shaft on an opposite side of said sleeve and wall, said disk means covering said opposite side of said sleeve for fixing an axial position of said shaft in the chamber wall bore.

* * * * *